(12) United States Patent
Jansen

(10) Patent No.: US 8,864,219 B2
(45) Date of Patent: Oct. 21, 2014

(54) METHOD FOR CONNECTING TWO OBJECTS AND PANEL USING SAID METHOD

(75) Inventor: Carolus Theodorus Wilhelmus Petrus Jansen, Vierlingsbeek (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/288,537

(22) Filed: Nov. 3, 2011

(65) Prior Publication Data
US 2012/0126584 A1    May 24, 2012

(30) Foreign Application Priority Data

Nov. 4, 2010   (EP) .................................... 10189951

(51) Int. Cl.
| | | |
|---|---|---|
| B60J 7/00 | (2006.01) | |
| B29C 45/16 | (2006.01) | |
| B60J 7/04 | (2006.01) | |
| B29C 45/14 | (2006.01) | |
| F16B 11/00 | (2006.01) | |
| B29C 45/00 | (2006.01) | |
| B29L 31/10 | (2006.01) | |
| B29C 65/52 | (2006.01) | |
| B60R 13/02 | (2006.01) | |
| B29C 65/00 | (2006.01) | |

(52) U.S. Cl.
CPC ............. B60J 7/04 (2013.01); *B29L 2031/108* (2013.01); *B29C 65/524* (2013.01); B29C 45/1671 (2013.01); *B60R 13/0231* (2013.01); *B29C 66/7483* (2013.01); B29C 45/14336 (2013.01); *B60R 13/0218* (2013.01); F16B 11/006 (2013.01); *B29C 45/0053* (2013.01); *B29C 66/474* (2013.01)

USPC ...................................... 296/216.09; 156/291

(58) Field of Classification Search
USPC ........... 296/84.1, 96.21, 215, 216.06, 216.09, 296/29; 156/245, 291
See application file for complete search history.

(56) References Cited

U.S. PATENT DOCUMENTS 4,561,922 A * 12/1985 Peerman et al. ............ 156/331.4
5,230,759 A *  7/1993 Hiraiwa ......................... 156/69

(Continued)

FOREIGN PATENT DOCUMENTS

| DE | 102005006937 | 8/2006 |
|---|---|---|
| DE | 102005008678 | 8/2006 |
| GB | 2447625 | 9/2008 |

OTHER PUBLICATIONS

Translation of DE102005006937 from ESPACENET.*

(Continued)

*Primary Examiner* — Dennis H Pedder
(74) *Attorney, Agent, or Firm* — Steven M. Koehler; Westman, Champlin & Koehler, P.A.

(57) ABSTRACT

In a method for connecting two objects, comprising applying to at least one of said objects a volume of an adhesive of the type which, when cured, is flexible and thereafter a step of bringing the other of said objects in contact with said volume of adhesive, there is the additional step of, before applying said volume of adhesive, providing a stiffening device extending from and attached to the object to which said volume is to be applied and with a height which is less than the height of the completed volume of adhesive, after which additional step the volume of adhesive is applied around said stiffening device.

13 Claims, 4 Drawing Sheets

(56) References Cited

U.S. PATENT DOCUMENTS

| | | | | |
|---|---|---|---|---|
| 5,577,798 | A * | 11/1996 | Ichinohe et al. | 296/216.09 |
| 7,404,598 | B2 * | 7/2008 | Huebner et al. | 296/216.09 |
| 2003/0183332 | A1 * | 10/2003 | Simila | 156/291 |
| 2006/0052467 | A1 * | 3/2006 | Pignagnoli et al. | 521/130 |
| 2011/0017261 | A1 * | 1/2011 | Saita et al. | 136/244 |

OTHER PUBLICATIONS

Official Search Report of the European Patent Office in counterpart foreign application No. EP 10189951.6 filed Nov. 4, 2010.

\* cited by examiner

METHOD FOR CONNECTING TWO OBJECTS AND PANEL USING SAID METHOD

BACKGROUND

The discussion below is merely provided for general background information and is not intended to be used as an aid in determining the scope of the claimed subject matter.

The invention firstly relates to a method for connecting two objects, comprising a step of applying to at least one of said objects a volume of an adhesive of the type which, when cured, is flexible and thereafter a step of bringing the other of said objects in contact with said volume of adhesive.

When the above method is used for connecting two objects which experience thermal expansions which strongly differ, the completed volume of adhesive should provide sufficient flexibility to compensate for this difference in thermal expansion. This problem, for example, may arise when a steel object is connected to a plastic object, as may be the case in an open roof construction for a vehicle in which profiled reinforcement members of steel are connected with a plastic panel. When the volume of adhesive is not capable of coping with the different thermal expansions the constitutive parts of such a connection will be subjected to high stresses and will distort in an unacceptable manner.

The most effective way to ensure that the volume of adhesive has sufficient flexibility is by increasing the height thereof. However, such an increased height leads to certain problems during the manufacture of said volume of adhesive. During its application the adhesive tends to flow out on the respective object because it is not yet cured. This means that it is very difficult or even impossible to create a volume of adhesive with sufficient height. And even if the consistency of the adhesive allows to create a volume thereof with sufficient height, such a volume tends to be very unstable. When, for example, the volume is manufactured using an injection molding nozzle, moving away the nozzle from a deposited volume of adhesive tends to damage this volume (or make it unstable) due to the fact that part of the deposited adhesive still sticks to the nozzle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention includes a method for connecting two objects comprising applying to at least one of said objects a volume of an adhesive of the type which, when cured, is flexible and thereafter bringing the other of said objects in contact with said volume of adhesive. In addition, the method includes, before applying said volume of adhesive, providing a stiffening device extending from and attacked to the object to which said volume is to be applied and with a height which is less than the height of the completed volume of adhesive, after which an additional volume of adhesive is applied around said stiffening device.

The stiffening device ensures that the volume of adhesive may be manufactured with the desired height for obtaining the required flexibility.

In one embodiment of the method according to the present invention the stiffening device is injection molded to said object. But also other ways for attaching it are conceivable (e.g. using an adhesive, welding etcetera).

In another embodiment of the method according to the present invention the stiffening device is manufactured integrally with the respective object during the manufacture of latter so as to be formed as a single unitary body. This means that an additional step of attaching the stiffening device to the object can be omitted.

In one embodiment, the volume of adhesive is injection molded around the stiffening device. This makes the method easy to accomplish. When combined with the embodiment in which the stiffening device is injection molded to said object, a two-step injection molded process may be applied (of which the separate steps may be carried out at different times at different locations, if needed).

In one embodiment of the method according to the present invention the volume of adhesive comprises an elongate bead of adhesive and the stiffening device comprises a single elongate stiffening ridge extending along substantially the entire length of the elongate bead. The ratio between the length of the stiffening ridge and the length of the bead may differ in accordance with the circumstances and requirements.

As an alternative it is also possible that the volume of adhesive comprises a succession of adhesive dots and the stiffening device comprises a stiffening pillar positioned in each of these dots. The number of and spacing between the dots may differ in many ways, depending on the required characteristics of the completed connection.

The effect of the stiffening device on the behavior of the adhesive during manufacture of a connection is believed to rely partly on adhesion forces acting between the stiffening device and adhesive which prevent the undesired flow of the non cured adhesive. When, however, in addition the method according to the present invention further comprises the step of providing auxiliary stiffening device which will engage opposite sides of the base of the volume of adhesive, the flow of the adhesive also is prevented by such auxiliary stiffening device which define a barrier for the adhesive at the base of the volume (where the volume is attached to the respective object).

Preferably, then, the height of the auxiliary stiffening device is less than the height of the stiffening device. Such a smaller height is sufficient to obtain the desired effect.

Specifically, when the volume comprises an elongate bead of adhesive, it is possible that the auxiliary stiffening device comprise two elongate stiffening ridges, which each extend along the base of the bead, at opposite sides thereof.

In another embodiment, in which the volume comprises a succession of adhesive dots, it is possible that the auxiliary stiffening device comprise a number of ring shaped stiffening bodies each positioned around the basis of a dot of adhesive.

In a specific embodiment of the method according to the present invention one of said objects is a panel (e.g. plastic panel) of an open roof construction for a vehicle and the other object is a profiled reinforcement member (e.g. made out of steel).

The invention also relates to a panel intended for use in an open roof construction for a vehicle, which panel has connected thereto a member, and which member is connected to the panel using the method according one or more of the aspects above.

Another aspect of the invention is a panel assembly configured for use in an open roof construction for a vehicle. The panel assembly includes a panel, an object, a volume of cured adhesive joining the panel to the object, the volume of adhesive of a type which, when cured, is flexible, and a stiffening device attached to the panel and disposed in the volume of cured adhesive where the volume of cured adhesive is disposed around the stiffening device, the stiffening device having a height from the panel that is less than a height of the volume of cured adhesive from the panel.

Yet another aspect of the invention is an assembly that includes a first object, a second object, a volume of cured adhesive joining the first object to the second object, the volume of adhesive of a type which, when cured, is flexible, and a stiffening device joined to one disposed in the volume of cured adhesive where the volume of cured adhesive is disposed around the stiffening device, the stiffening device having a height from the first object that is less than a height of the volume of cured adhesive from the first object.

Yet another aspect of the invention is a method for connecting two objects. The method includes providing a first object and a second object, wherein the first object includes a stiffening device attached to or formed integral therewith as a single unitary body so as to extend away from a surface of the first object. To one of the objects so as to be disposed around the stiffening device a volume of an adhesive of a type which, when cured, is flexible is applied. The objects are brought together so as to bring the other of the objects in contact with said volume of adhesive so that the stiffening device extends into the volume of adhesive. Thereafter, the volume of adhesive is allowed to cure wherein a portion of the volume of adhesive is disposed between a remote end of the stiffening device and a surface of the second object to separate the remote end of the stiffening device from the surface of the second object.

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

Figure 1:
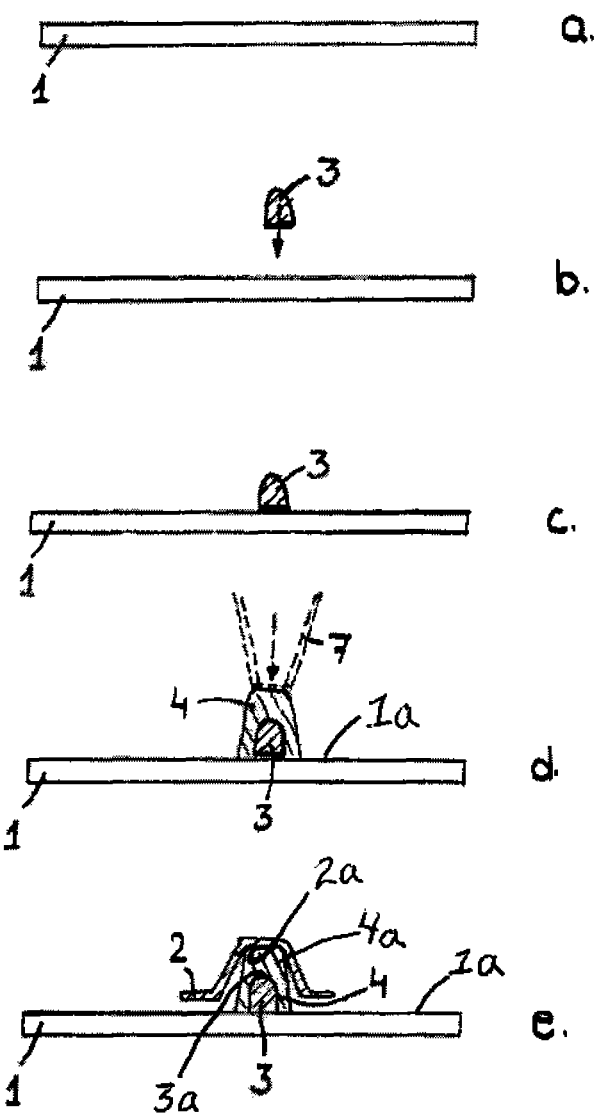
FIG. 1 schematically shows five consecutive stages during the manufacture of a connection between two objects using an embodiment of the method.

Firstly referring to FIG. 1 a method for connecting two objects is illustrated during five consecutive stages. An object 1 is provided (stage a) to which an object 2 has to be connected. During stage b a stiffening member 3 is attached to the object 1 so as to extend away from the object 1. This may be accomplished by any appropriate manner (adhesive, welding, injection molding etcetera).

The stiffening member 3 and object 1 also may be manufactured as an integral, unitary part during the manufacture of the object 1 so that the stiffening device 3 extends away from the object 1. In the latter case both parts preferably will comprise the same material, and in the former case these parts also may comprise different materials.

When the stiffening device 3 is attached to and extends from the object (stage c) a volume 4 of an adhesive of the type which, when cured, is flexible is applied around the stiffening device 3 and on top of the object 1 (stage d). The application of said volume 4 of adhesive may occur in any proper manner, e.g. using an injection molding technique with an injection molding nozzle 7. As a final step the other of said objects 2 is brought in contact with said volume 4 of adhesive (stage e) after which a curing of the adhesive may occur to complete the connection between the objects 1 and 5.

As appears from FIG. 1, the stiffening device 3 has a height (as measured perpendicularly to the surface of object 1) which is less than the height of the completed volume of adhesive 4 as measured for example from a surface 1a of object 1. Stated another way, the adhesive 4 is allowed to cure wherein a portion 4a of the volume of adhesive 4 is disposed between a remote end 3a of the stiffening device 3 and a surface 2a of the second object 2 to separate the remote end 3a of the stiffening device 3 from the surface 2a of the second object 2.

Figure 2:
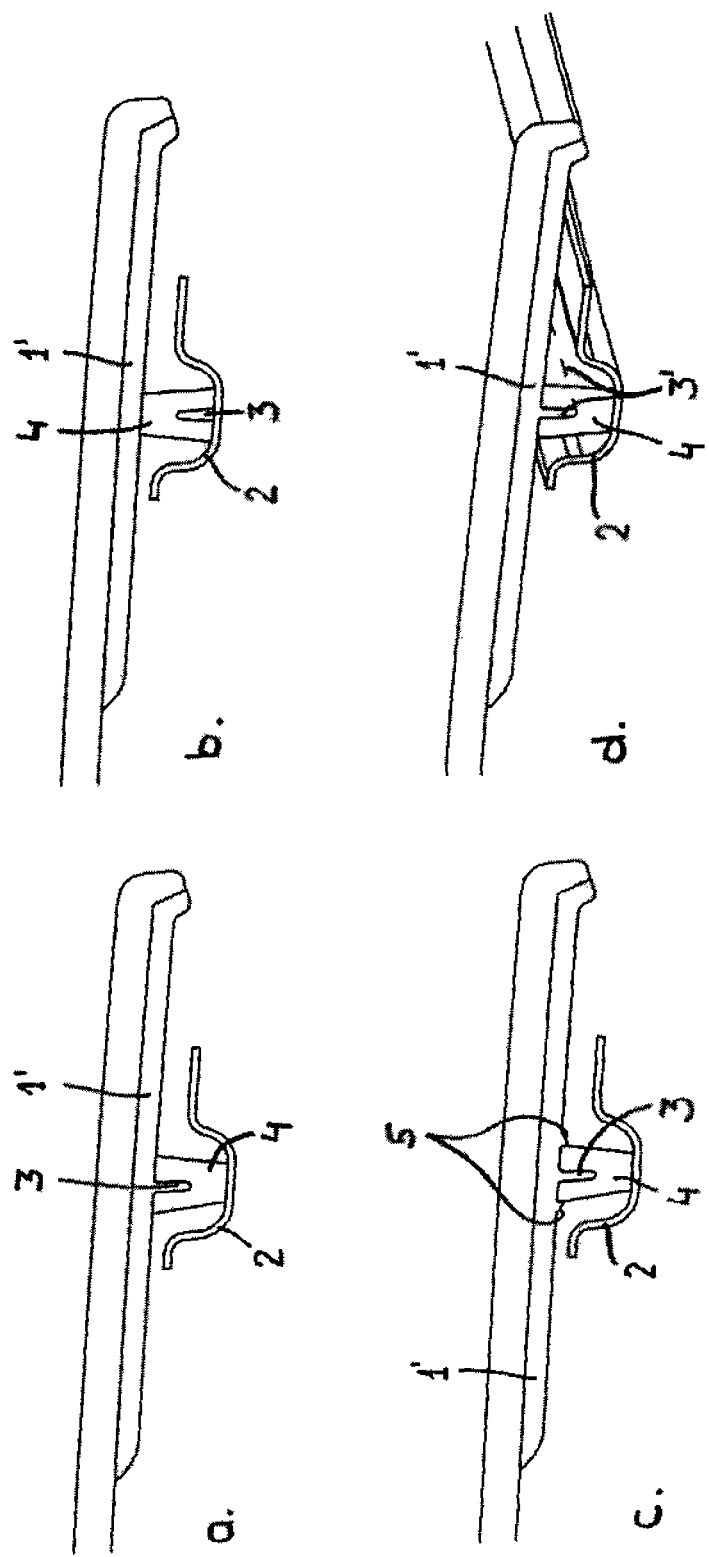
FIG. 2 shows four alternative embodiments of the stiffening device.
Figure 4:
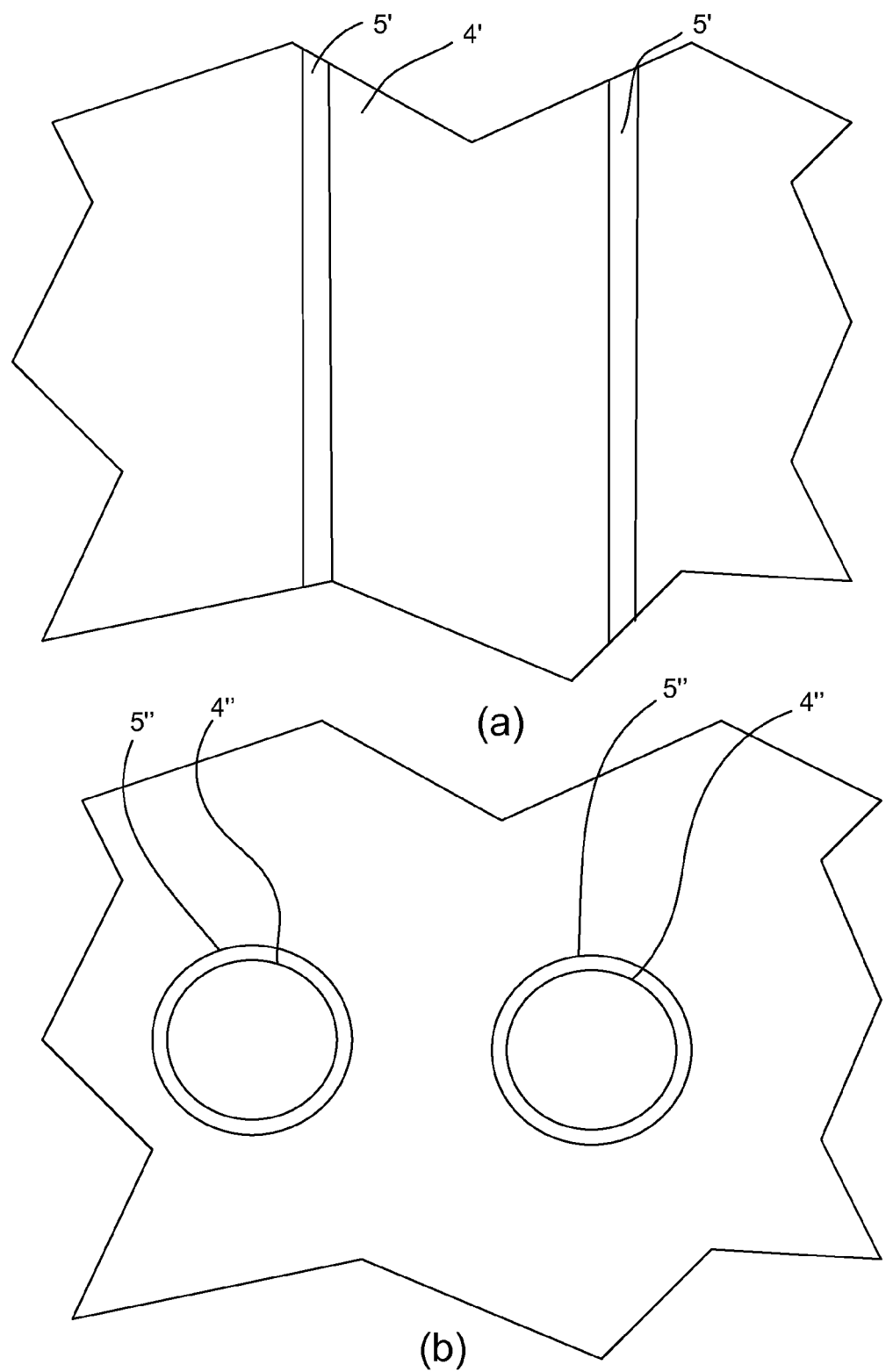
FIG. 4 schematically shows 2 alternative embodiments of auxiliary stiffening devices.

FIG. 2 shows a number of different embodiments of the invention. In FIG. 2a the stiffening device 3 is attached to (or an integral unitary part of) an object 1'. In FIG. 2b the stiffening device 3 is attached to (or an integral part of) object 2. In FIG. 2c the stiffening device 3 is attached to (or an integral part of) object 1' and additionally auxiliary stiffening device 5 are provided which engage opposite sides of the base of the completed volume of adhesive 4. These auxiliary stiffening devices 5 may be provided in a manner similar to the auxiliary stiffening device 3 and may comprise two elongate stiffening ridges 5' when the volume of adhesive 4' comprises an elongate bead, as illustrated in FIG. 4a, and may comprise a ring shaped body 5" when the volume of adhesive comprises dots 4", as illustrated in FIG. 4b. The height of the auxiliary stiffening device 5 is less than the height of the stiffening device 3.

FIG. 2d shows an embodiment similar to FIG. 2a, and in which the stiffening device comprises a single elongate stiffening ridge 3' extending along substantially the entire length of an elongate bead of adhesive 4.

Figure 3:
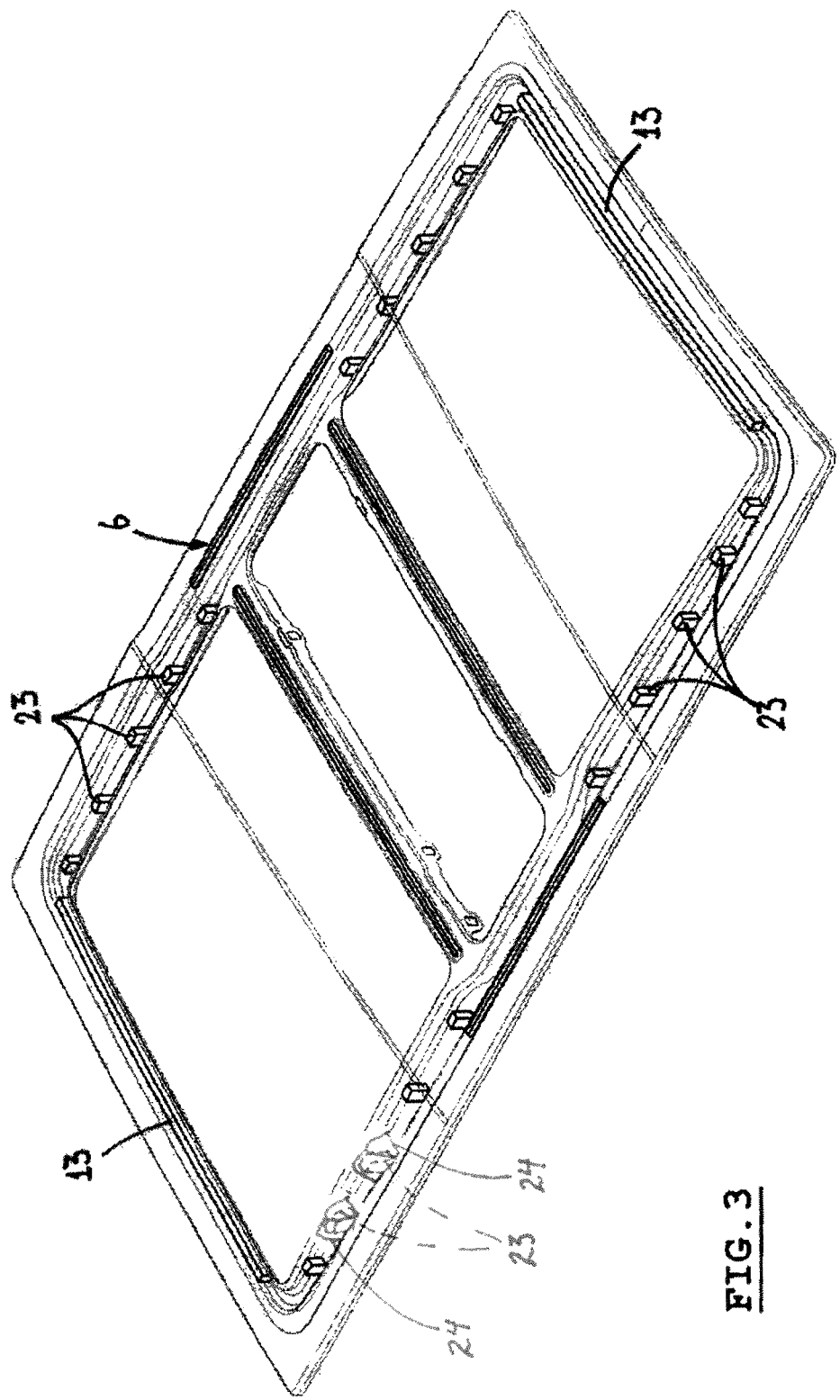
FIG. 3 shows a panel of an open roof construction embodying the present invention.

Referring to FIG. 3, a panel assembly having a panel 6 is illustrated that is configured for use in an open roof construction for a vehicle. This panel 6 will have profiled reinforcement members connected thereto by means of volumes of adhesive. FIG. 3 does not show these profiled reinforcement members (which may be shaped as the objects 2 shown in FIGS. 1 and 2) nor all the volumes of adhesive, but is provided to show different embodiments of stiffening device.

Thus FIG. 3 shows a stiffening device 13 which will extend along substantially the entire length of an elongate bead to be provided there around, but not shown in this figure. Further FIG. 3 shows stiffening devices comprising a number of distinct spaced apart stiffening pillars 23 positioned alongside each other to be surrounded by dots or volumes of adhesive, two of which are shown at 24. Hence, the volumes of adhesive 24 for the stiffening pillars 23 can be spaced apart from each other, although in another embodiment a continuous volume of adhesive can have a plurality of spaced apart pillars 23 therein.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:
1. A method for connecting two objects, comprising:
providing a first object and a second object, wherein the first object includes a stiffening device attached to or formed integral therewith as a single unitary body so as to extend away from a surface of the first object;

applying to the first object and around the stiffening device a volume of an adhesive of a type which, when cured, is flexible;

thereafter bringing the second object in contact with said volume of adhesive; and thereafter allowing the volume of adhesive to cure, wherein a height of the stiffening device extending from the surface of the first object is less than a height of the cured volume of adhesive from the surface of the first object.

2. The method according to claim 1, wherein the stiffening device is injection molded to said first object.

3. The method according to claim 1, wherein the stiffening device is manufactured integrally with the first object during the manufacture of latter.

4. The method according to claim 1, wherein the volume of adhesive is injection molded around the stiffening device.

5. The method according to claim 1, wherein the volume of adhesive comprises an elongate bead of adhesive and wherein the stiffening device comprises a single elongate stiffening ridge extending along substantially the entire length of the elongate bead.

6. The method according to claim 1, wherein the volume of adhesive comprises a succession of adhesive dots and wherein the stiffening device comprises a stiffening pillar positioned in each of these dots.

7. The method according to claim 1, further comprising providing an auxiliary stiffening device which will engage a base of the completed volume of adhesive.

8. The method according to claim 7, wherein a height of the auxiliary stiffening device is less than the height of the stiffening device.

9. The method according to claim 7, wherein the auxiliary stiffening device comprise two elongate stiffening ridges.

10. The method according to claim 7 in combination with claim 6, wherein the auxiliary stiffening device comprise a number of ring shaped stiffening bodies each positioned around the basis of a dot of adhesive.

11. The method according to claim 1, wherein one of said objects is a panel of an open roof construction for a vehicle and the other object is a profiled reinforcement member.

12. A panel configured for use in an open roof construction for a vehicle, which panel has connected thereto a member, wherein the member is connected to the panel using the method according to claim 1.

13. A method for connecting two objects, comprising:

providing a first object and a second object, wherein the first object includes a stiffening device attached to or formed integral therewith as a single unitary body so as to extend away from a surface of the first object;

applying to one of the objects so as to be disposed around the stiffening device a volume of an adhesive of a type which, when cured, is flexible; and thereafter bringing the objects together and thereafter allowing the volume of adhesive to cure wherein a portion of the cured volume of adhesive is disposed between a remote end of the stiffening device and a surface of the second object to separate the remote end of the stiffening device from the surface of the second object, and wherein the volume of adhesive adheres to the first object, the second object, and the stiffening device.

* * * * *